(12) United States Patent
Nalbandian et al.

(10) Patent No.: US 6,237,283 B1
(45) Date of Patent: May 29, 2001

(54) LINKED SUB-IRRIGATION RESERVOIR SYSTEM

(75) Inventors: A. Eugene Nalbandian, 2100 Ocean Blvd., Newport Beach, CA (US) 92663; Charles Hewitt, Pinon Hills, CA (US)

(73) Assignee: A. Eugene Nalbandian, Newport Beach, CA (US)

(*) Notice: Subject to any disclaimer, the term of this patent is extended or adjusted under 35 U.S.C. 154(b) by 0 days.

(21) Appl. No.: 09/410,376

(22) Filed: Sep. 30, 1999

Related U.S. Application Data
(60) Provisional application No. 60/102,465, filed on Sep. 30, 1998.

(51) Int. Cl.[7] ............................ A01G 29/00; A01G 27/02
(52) U.S. Cl. ........................................ 47/48.5; 47/79
(58) Field of Search .................... 47/79, 48.5, 62 E, 47/59, 80, 40.5, 25

(56) References Cited

U.S. PATENT DOCUMENTS

| | | | |
|---|---|---|---|
| D. 278,076 | * 3/1985 | Dryden | D8/1 |
| 774,988 | * 11/1904 | Maurer | 47/79 |
| 1,029,107 | * 6/1912 | Couls | 405/39 |
| 1,133,182 | * 3/1915 | Ray | 47/48.5 |
| 1,383,368 | * 7/1921 | Ambrose | 47/79 |
| 2,105,800 | * 1/1938 | Watkins | 47/48.5 |
| 2,501,260 | * 3/1950 | Brodin | 422/274 |
| 2,817,956 | * 12/1957 | Young | 405/45 |
| 3,916,565 | * 11/1975 | Runyon | 47/58 |
| 4,060,991 | * 12/1977 | Reese | 405/36 |
| 4,087,938 | * 5/1978 | Koch | 47/48.5 |
| 4,156,324 | * 5/1979 | Henttonen | 47/48.5 |
| 4,160,342 | 7/1979 | Dryer | 47/80 |
| 4,183,175 | * 1/1980 | Magee | 47/79 |
| 4,231,187 | 11/1980 | Greenbaum | 47/80 |
| 4,236,351 | 12/1980 | Smith | 47/79 |
| 4,356,665 | 11/1982 | De Oliveira | 47/80 |
| 4,546,571 | * 10/1985 | Scrivens | 47/81 |
| 4,729,189 | 3/1988 | Whitcomb | 47/39 |
| 4,771,572 | 9/1988 | Higa | 47/58.1 |
| 4,878,780 | * 11/1989 | Vidal | 405/38 |
| 4,962,613 | 10/1990 | Nalbandian | 47/79 |
| 4,991,346 | 2/1991 | Costa, Jr. et al. | 47/80 |
| 5,020,275 | 6/1991 | Bednarzik | 47/79 |
| 5,046,282 | * 9/1991 | Whitaker | 47/79 |
| 5,129,183 | 7/1992 | Haw | 47/81 |
| 5,155,934 | 10/1992 | Leider | 47/86 |
| 5,174,062 | 12/1992 | Kim | 47/81 |
| 5,307,589 | * 5/1994 | Rigsby | 47/59 |
| 5,443,544 | 8/1995 | Azoulay | 47/48.5 |
| 5,581,937 | 12/1996 | Jenkins | 47/71 |
| 5,615,517 | 4/1997 | Smith | 47/48.5 |
| 5,644,868 | 7/1997 | Lui | 47/81 |
| 5,685,488 | 11/1997 | Gwartney | 239/279 |
| 5,768,825 | * 6/1998 | Reiger | 47/78 |

FOREIGN PATENT DOCUMENTS

| | | |
|---|---|---|
| 2 293 142 | 7/1976 | (FR) . |
| 2 314 657 | 1/1977 | (FR) . |
| 2 145 914A | 4/1985 | (GB) . |
| 10234225 | 9/1998 | (JP) . |
| WO 96/10493 | 4/1996 | (WO) . |
| WO 96/39801 | 12/1996 | (WO) . |

* cited by examiner

Primary Examiner—Charles T. Jordan
Assistant Examiner—Son T. Nguyen
(74) Attorney, Agent, or Firm—Knobbe, Martens, Olson & Bear, LLP

(57) ABSTRACT

The present invention relates to a subirrigation system designed for deployment within an absorbent soil medium beneath one or more plants. The system comprises one or more reservoirs that may be partially filled with an irrigating liquid. The top of each reservoir has a plurality of holes to allow for drainage and air exchange and at least one trough, which extends down into the reservoir. The trough floor has a plurality of holes so that irrigating liquid in the reservoir may pass into the absorbent soil medium which fills the trough and upward by capillary movement to the roots. Systems for linking, automating and controlling the subirrigation process are disclosed.

26 Claims, 6 Drawing Sheets

LINKED SUB-IRRIGATION RESERVOIR SYSTEM

RELATED APPLICATIONS

This application claims priority under 35 U.S.C. §119(e) to Provisional Application No. 60/102,465 filed on Sep. 30. 1998.

BACKGROUND OF THE INVENTION

This invention relates to a sub-irrigation system for growing plants and more particularly to a system of linked reservoirs that can be placed beneath the soil to facilitate sub-irrigation by capillary action.

Historically, cultivated plants have been watered using various sprinkler or open canal-based systems. Unfortunately, these traditional irrigation methods are associated with numerous drawbacks. Water conservation, especially in more arid climates, is a major concern with such irrigation methods. Spraying is particularly problematic, because water droplets are dispersed into the air, thereby increasing the surface area of the water and facilitating evaporation. In addition to the loss of water through evaporation, water applied by surface irrigation methods may also be lost to the underlying ground water via percolation through the soil. Besides poor water conservation, further disadvantages of sprinkler-based surface irrigation methods are: 1) leaching of nutrients and fertilizers away from the root systems and out of the soil, 2) washing of pesticides off the leaves and out of the soil, 3) contamination of ground water with environmentally hazardous levels of fertilizer and pesticides, 4) erosion of soil, 5) damage to building surfaces, walkways and flooring (staining, rotting, hard-water deposits, etc.) from misdirected sprinklers and inadvertently sprayed water, 6) damage to walkways and flooring from excess water draining from planters, beds, and pots, and 7) personal injury liability from slippery flooring surfaces. Thus, surface irrigation methods, especially sprinkler-based systems are inefficient in terms of water conservation and associated with numerous disadvantages and potentially harmful effects.

A variety of subirrigation methods and devices have been developed to address some of the problems associated with surface irrigation. Most subirrigation systems take advantage of attractive forces that exist between water molecules themselves (adhesion) and between water molecules and other polar or hydrophilic substances (cohesion). In nature, the adhesive and cohesive properties of water permit continuous columns of water to rise hundreds of feet through narrow conductive elements, like capillaries, from the roots beneath the soil up into the leaves, from where the water evaporates through tiny pores in the leaves. Such movement is known as capillary action. Typically, prior art subirrigation systems provide water to plants via capillary movement of water from a lower reservoir, through some conducting means and into the soil in a planter, wherein the reservoir, conducting means, and planter comprise an integrated system. Generally, such systems also incorporate a means for providing air and water to the lower reservoir, as well as a means for permitting aeration and drainage of the planter.

In particular, U.S. Pat. No. 4,160,342 to Dryer, U.S. Pat. No. 4,231,187 to Greenbaum, U.S. Pat. No. 4,356,665 to de Oliveira, U.S. Pat. No. 4,962,613 to Nalbandian, U.S. Pat. No. 4,991,346 to Costa, (incorporated herein by reference) all teach variations of two-compartment, integrated subirrigation systems for growing plants, comprising a lower reservoir and an upper planter, with an airspace in the reservoir between the bottom of the planter and the surface of the water. The planter compartments are in fluid communication with the lower reservoirs via a variety of water conducting elements, such as wells, troughs or tubes, etc., which extend from the bottom of the planter to below the surface of the water in the reservoir. The conducting elements are perforated below the surface of the water and open to the soil in the planter compartment so that water in the reservoir may move into an adsorptive medium within the conducting element and subsequently rise up into the soil by capillary action.

The bottoms of these prior art planters also typically have holes through which excess water in the soil may drain into the reservoirs and through which oxygen can migrate from the airspace up into the soil. The means for adequate drainage and aeration are critical to a healthy root system and plant. Roots submerged in soil saturated with water deteriorate from lack of sufficient oxygen. These references also generally provide a vertical tube or channel between the lower reservoir and the air above the soil, through which water can be added to the reservoir and through which air may move freely between the atmosphere and the airspace in the reservoir.

While the prior art subirrigation planters described above address some of the disadvantages seen with surface irrigation methods, these integrated two-compartment systems are not well suited for large-scale commercial use. Each planter requires individual monitoring and care. Although the nursery industry typically employs overhead sprinklers to water large numbers of plants, there have been some attempts to secure the benefits of subirrigation technology on a commercial scale. For example, Whitcomb (U.S. Pat. No. 4,729, 189) discloses an automatic subirrigation mat having attached thereto a plurality of fluid-conveying channels, which are connected along one edge of the mat, to a main water pipe. Each channel has a number of outlets or holes designed to align with the center holes in the bottom of standard nursery pots, such that water conveyed by the channels moves under pressure through the outlets directly into the soil within the pots. Whitcomb teaches a variety of specialized valves and outlet structures for regulation of water flow. While the reference teaches watering of many plants, through a network of coupled channels, it does not describe a passive watering mechanism (i.e. via capillary action), nor does it provide means for drainage and aeration.

Bednarzik (U.S. Pat. No. 5,020,275) also teaches an automated subirrigation system comprising an inner planter having a nozzle extending downward from an opening in its bottom, and an outer pot, having a sealing means which closes off the nozzle when the planter rests in its lowest position within the outer pot. The outer pot has a water inlet line for conveying water into the outer pot. The inner planter will float as the water level in the outer pot rises, thereby opening the nozzle and permitting irrigation of the soil. As the water content within the planter increases, it sinks, thereby sealing the nozzle and preventing further watering. Subsequently, as water is used and evaporates from the planter, it begins to float, once again opening the nozzle and causing water to enter the planter under hydrostatic pressure, as well as via capillary action. The water level in the outer pot is regulated by an external float valve. Bednarzik discloses the interlinking of many such automatic watering pots to a central, regulated water line. However, Bednarzik, like Whitcomb, does not provide a means for drainage and aeration. As mentioned above, adequate drainage and aeration are critical to healthy roots and plants.

Thus, there is a significant need for a commercial scale planter system that affords the excellent water conservation of subirrigation, avoids the many disadvantages of sprinkler systems, is adaptable to automated operation and nutrient supplementation, and provides adequate drainage and aeration.

SUMMARY OF THE INVENTION

The present invention is related to an irrigation system that provides excellent water conservation and avoids the many disadvantages of sprinkler systems, including damage to building surfaces and walkways from misdirected sprinklers and excess water draining from planters, and personal injury liability from slippery flooring surfaces. The subirrigation system disclosed is adaptable to automated operation and nutrient supplementation, and provides drainage and root aeration.

The subirrigation apparatus of the present invention comprises a reservoir with a top and a bottom, the reservoir being capable of holding an irrigating liquid. The reservoir can be made in a variety of shapes, designed to fit inside any conventional planter or plant bed or turf area. The top of the reservoir has a plurality of holes therethrough and at least one open trough with a trough floor which is disposed between the top and the bottom of the reservoir. The trough floor has a plurality of holes therethrough.

In one embodiment, the reservoir also has an elongated hollow fill tube affixed to an opening in the top of the reservoir. The fill tube extends upward from the top of the reservoir, wherein an irrigating liquid may be added to the reservoir and wherein atmospheric gases may diffuse freely between the reservoir and an outer atmosphere.

The subirrigation apparatus of the present invention preferably includes an absorptive soil, which is adapted to support an upward capillary movement of the irrigating liquid from said trough floor to a plant's root system located above the reservoir.

In another embodiment, the subirrigation apparatus of the present invention further includes an inlet for delivering the irrigating fluid into the reservoir and an outlet for draining excess irrigating fluid out of the reservoir. The inlet and outlet are located along a sidewall that connects the top and bottom of the reservoir, and the inlet and outlet are positioned vertically above said trough floor.

In a variation, adapted to function automatically, the subirrigation apparatus may include a pressure-sensitive valve interconnected with the inlet for regulating delivery of the irrigating fluid into the reservoir. The inlet is further preferably connected to a supply line, which is connected to a pressurizable source of irrigating fluid.

A linked subirrigation system in accordance with the present invention is also disclosed. The system comprises at least a first and a second reservoir, each reservoir having a top, a bottom, and a sidewall. Each reservoir is capable of holding an irrigating liquid. The top has a plurality of holes therethrough and at least one open trough with a trough floor which is disposed between the top and the bottom of the reservoir. The trough floor has a plurality of holes therethrough, so water in the reservoir may move into an absorptive soil placed in the trough and above the reservoir. In one embodiment, the system also includes an inlet port affixed to a first opening in the sidewall of each reservoir and an outlet port affixed to a second opening in the sidewall of each reservoir. The inlet and outlet ports are positioned above the trough floor, wherein the irrigating liquid may be supplied to the reservoir through the inlet port and drain from the reservoir through the outlet port. The reservoirs are linked by at least one linking tube, connecting the outlet port of one reservoir to the inlet port of the next reservoir, such that the irrigating liquid supplied to the first reservoir may flow out from the outlet port of the first reservoir through the linking tube and into the second reservoir. Any additional reservoirs are linked in the same manner, from outlet to inlet, using additional linking tubes.

The linked subirrigation system further comprises an absorptive soil adapted to support an upward capillary movement of the irrigating liquid from said trough floor in each reservoir to a plant's root system located above the reservoirs. The absorptive soil comprises a mixture of sand or perlite, peat moss, ground bark and composted mulch. The sand or perlite comprises from about 5% to about 20% by volume of the absorptive soil. The peat moss comprises from about 10% to about 30% by volume of the absorptive soil. The ground bark comprises from about 20% to about 60% by volume of the absorptive soil. The composted mulch comprises from about 15% to about 50% by volume of the absorptive soil. In a preferred formulation, the soil mixture contains about 10% by volume sand or perlite, about 20% by volume peat moss, about 40% by volume ground bark and about 30% by volume of composted mulch.

The linked subirrigation system may include a pressure-sensitive valve interconnected with the inlet port for regulating delivery of the irrigating fluid into the linked subirrigation system. Preferably, the inlet port of the first reservoir is connected to a supply line, which is connected to a pressurizable source of irrigating fluid.

Another variation of a subirrigation system designed for deployment within an absorbent soil medium beneath one or more plants comprises a reservoir having a bottom, sidewalls, and a top. The reservoir is partially filled with an irrigating liquid, wherein the top has a plurality of holes therethrough. The top also has at least one trough with a trough floor which is disposed between the top and the bottom of the reservoir, wherein said trough floor has a plurality of holes therethrough, such that the irrigating liquid in the reservoir may pass freely into the absorbent soil medium which fills the trough upon deployment beneath the plants.

Preferably this embodiment of the subirrigation system has an inlet port affixed to a first opening in the side wall of the reservoir and an outlet port affixed to a second opening in the side wall of the reservoir, wherein the irrigating liquid may be added to the reservoir through the inlet port and drain from the reservoir through the outlet port.

More preferably, the subirrigation system described above comprises a plurality of reservoirs that are arranged in a series having at least a first and a last reservoir. The outlet port of each reservoir in the series, except the last reservoir, is connected by a linking tube to the inlet port of the next reservoir, and the outlet port of the last reservoir is connected to a drain tube. A supply line is connected to the inlet port of the first reservoir, the supply line being adapted to deliver irrigating liquid to the first reservoir from a pressurizable source of irrigating liquid. In one embodiment, the supply line is a flexible tubing with two ends, one adapted to connect to the inlet port of the first reservoir and the other adapted to connect to a conventional faucet, wherein the irrigating liquid is water.

The subirrigation system also comprises a valve disposed between the supply line and the inlet port, wherein the valve is adapted to regulate the delivery of irrigating liquid to the first reservoir. In one preferred variation, the subirrigation system further comprises a controller in communication with at least one moisture sensor positioned in the soil and the valve, wherein the controller opens the valve to allow delivery of irrigating liquid from the pressurizable source to the first reservoir when the moisture sensor detects a preset low moisture content in the soil.

Optional components for inclusion with the above described automatic, linked subirrigation system include a fertilizer/pesticide injector, a heater/cooler, a circulating pump, a filter, an evacuation pump, an overflow drain, a flow monitor, and a timer.

In another preferred embodiment of the subirrigation system of the present invention, two reservoirs are included, each having an arcuate shape adapted to partially surround a root ball of a large plant or tree. A layer of porous material may be overlaid over at least a portion of the root ball, wherein the combination of the shaped reservoirs and the layer of porous material cooperate to inhibit an upward growth of roots.

DETAILED DESCRIPTION OF THE PREFERRED EMBODIMENT

Figure 1:
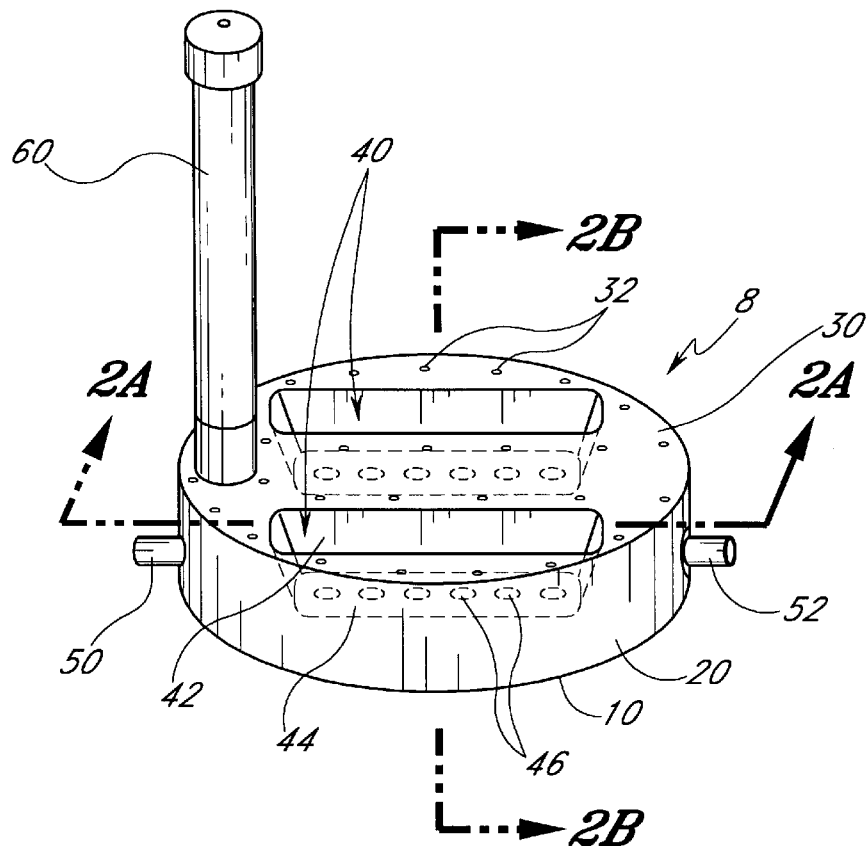
FIG. 1 is a perspective view of a subirrigation reservoir of the present invention.

With reference to FIG. 1, there is shown a reservoir in accordance with one embodiment of the basic unit of the subirrigation system of the present invention. The reservoir 8 is designed for deployment within an absorbent soil medium beneath one or more plants in a planter or bed. The reservoir 8 is defined by a substantially flat bottom 10, a sidewall 20, and a top 30. The top 30 of the reservoir 8 has a plurality of holes 32 therethrough. The top also has at least one trough 40, which is open at the top and extends downward into the reservoir, terminating before contacting the bottom 10 of the reservoir. The number of troughs may be increased for reservoirs of larger surface area. Preferably, the reservoir has two troughs. Each trough has sides 42 and a bottom 44, which has a plurality of holes 46 therethrough. The sidewall 20 of the reservoir preferably has an inlet port 50 and an outlet port 52, which allow water to enter and leave the reservoir. Optionally, the top 30 of the reservoir may be fitted with a fill tube 60, which extends upward from the top to above the surface of the soil in the planter or bed. The fill tube 60 allows users to check the water level using a dipstick and add water if necessary. The fill tube 60 also provides direct access for fresh air to move between the atmosphere above the soil and an airspace above the water in the reservoir.

Figure 2A:
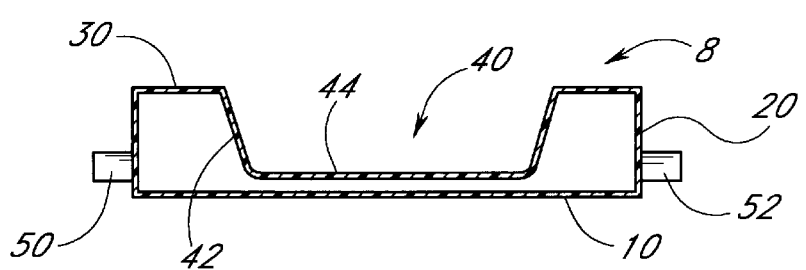
FIG. 2A is a cross-sectional view along the plane defined by 2A in FIG. 1.

With reference to FIG. 2A, a cross-sectional view along line 2A of the reservoir illustrated in FIG. 1 is shown. The open trough 40 is formed as an invagination of the top 30 of the reservoir. The trough sides 42 extend downward from the top 30 toward the bottom 10 of the reservoir, but terminate in a trough bottom 44 before contacting the reservoir bottom 10. The trough sides 42 may be perpendicular to the top or sloped as illustrated. The inlet 50 and outlet ports are also shown.

Figure 2B:
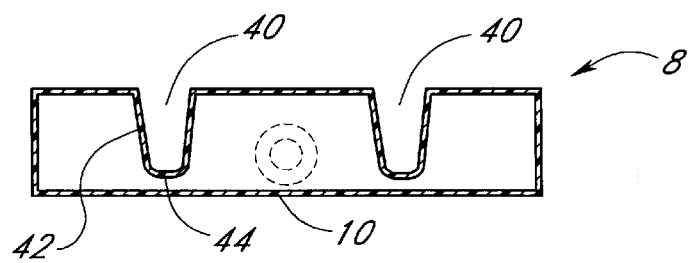
FIG. 2B is a cross-sectional view along the plane defined by 2B in FIG. 1.

FIG. 2B is a cross-sectional view along line 2B of the same reservoir pictured in FIG. 1. Now the two troughs 40 can be seen with an opening, disposed in the plane of the reservoir top 30, sloping vertical side walls 42, and a bottom 44, suspended above the reservoir bottom 10. The inlet 50 is shown in broken lines.

From FIGS. 1, 2A and 2B it can be appreciated that when the reservoir is partially filled with irrigating liquid, the trough bottom(s) 44 will extend below the surface of the liquid, wherein the holes in the trough bottom permit fluid communication with the soil which fills the troughs after the reservoir is deployed under the soil in a planter or bed.

Figure 3:
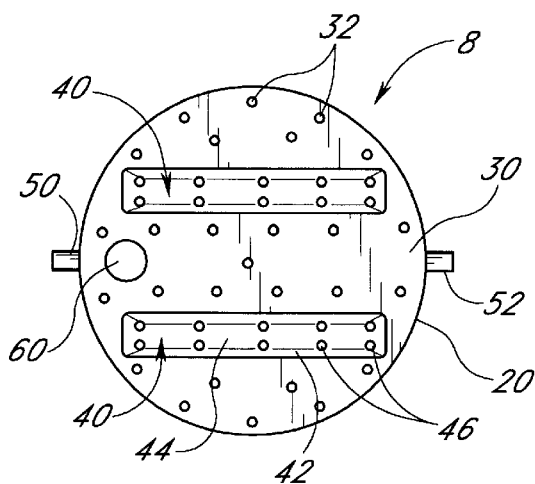
FIG. 3 is a top view of a circular subirrigation reservoir of the present invention.
Figure 4:
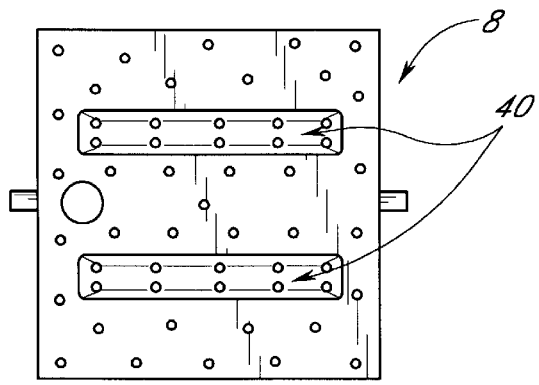
FIG. 4 is a top view of a rectangular subirrigation reservoir of the present invention.
Figure 5:
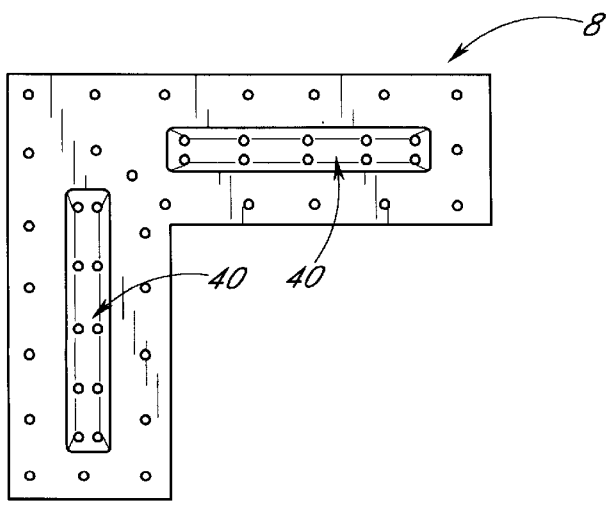
FIG. 5 is a top view of an L-shaped subirrigation reservoir of the present invention.

FIG. 3 shows a top view of a round reservoir in accordance with an embodiment of the present invention. The reservoir top 30 has a plurality of holes 32, a fill tube 60, and two troughs 40. Each trough 40 has vertical sides 42 and a bottom 44, the bottom having a plurality of holes 46 therethrough. Inlet 50 and outlet 52 ports are shown extending from the reservoir sidewall 20. FIG. 4 shows a rectangular, or square-shaped reservoir, and FIG. 5 shows an L-shaped reservoir, both embodiments having sharing the same features described for the round reservoir. It should be understood, however, that the reservoirs of the present invention are not limited to the particular shapes shown. Any shapes may be manufactured in accordance with the present invention depending on the application.

When a reservoir produced in accordance with the present invention is placed under the soil in a planter, or turf area, the holes 32 in the top surface (See e.g., FIG. 1) allow excess water from the soil above to drain into the reservoir. Further, the holes allow air within the reservoir to permeate upwards into the soil. The holes 46 in the bottom of the trough allow water in the reservoir to rise up into an absorptive soil that will fill the open trough and the planter above when the reservoir is deployed as part of the subirrigation system.

In a preferred embodiment of the present invention, a special capillary soil formulation is used in order to provide an appropriate medium for the capillary movement of water. The soil formulation preferably prevents over application of moisture to the roots systems and rapid drying of the medium. One formulation in accordance with the present invention comprises fine sand (for exterior applications) or perlite (for interior applications), long fiber sphagnum peat moss, ground fir bark, and composted redwood mulch. Preferably, the sand or perlite comprises from about 5% to about 20%, the peat moss comprises from about 10% to about 30%, the ground bark comprises from about 20% to about 60%, and the composted mulch comprises from about 15% to about 50%; all ranges reflect percentages of the total formulation by volume. One particularly preferred formulation comprises 10% sand or perlite, 20% peat moss, 40% bark and 30% composted mulch.

Other formulations may be used in accordance with the present invention as long as the soil provides adequate porosity, aeration and water drainage, and enhances capillary distribution of moisture throughout the root zone. Total soil density preferably ranges from about 10 to about 30 lbs per cubic foot, more preferably, about 20–25 lbs per cubic foot, and most preferably about 22.2 lbs per cubic foot. Total porosity preferably ranges from about 50% to about 90% by volume (dry), more preferably, about 80–85% by volume, and most preferably about 81.2% by volume. Air space preferably ranges from about 10% to about 35% at field capacity by volume in a 6" container, preferably about 15–25% and most preferably about 20.2% by volume. Available water at field capacity in a 6" container preferably ranges from about 20% to about 50% by volume, more preferably, about 30–40% by volume, and most preferably, about 35% by volume. Soil pH preferably ranges from about 5 to about 7.5, and more preferably, about 6 to about 6.5.

The absorptive soil media is preferably formulated from sterile components and is heated to eliminate unwanted weed seed and soil pathogens. Before using, the soil media is preferably supplemented with a nutritional formula, which will vary depending on the planting.

Figure 6:
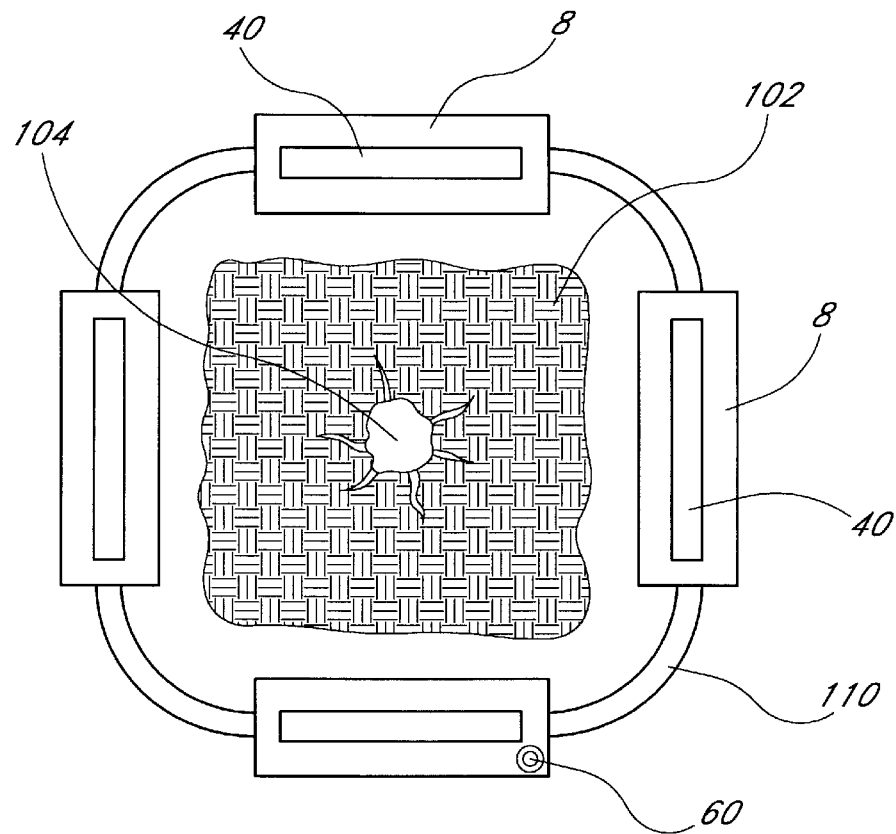
FIG. 6 is top view of a subirrigation system for trees in accordance with the present invention.

In one preferred embodiment of the present invention, the reservoirs may be linked. With reference to FIG. 6, a top view of a linked subirrigation system for trees or large shrubs is illustrated. Four reservoirs 8 with one trough 40 each are shown surrounding the root ball 102 of a tree or large plant 104. The reservoirs are linked by tubing 110 that connects the respective inlet and outlet ports of adjacent reservoirs. In this embodiment, the tubing 110 is flexible or may be pre-shaped to conform to the curve dictated by the placement of the reservoirs. A fill tube 60, which extends upward through the soil to above the surface of the soil is also provided. The fill tube 60 allows users to check the water level using a dipstick and add water if necessary. The fill tube 60 also provides direct access for fresh air to move between the atmosphere above the soil and an airspace above the water in the reservoirs.

The reservoirs may be placed at a lateral distance of about 24 to about 2 inches from the root ball 102. More preferably, the lateral distance is in a range of about 18 to about 4 inches and most preferably, about 12 to about 6 inches from the root ball.

Figure 7:
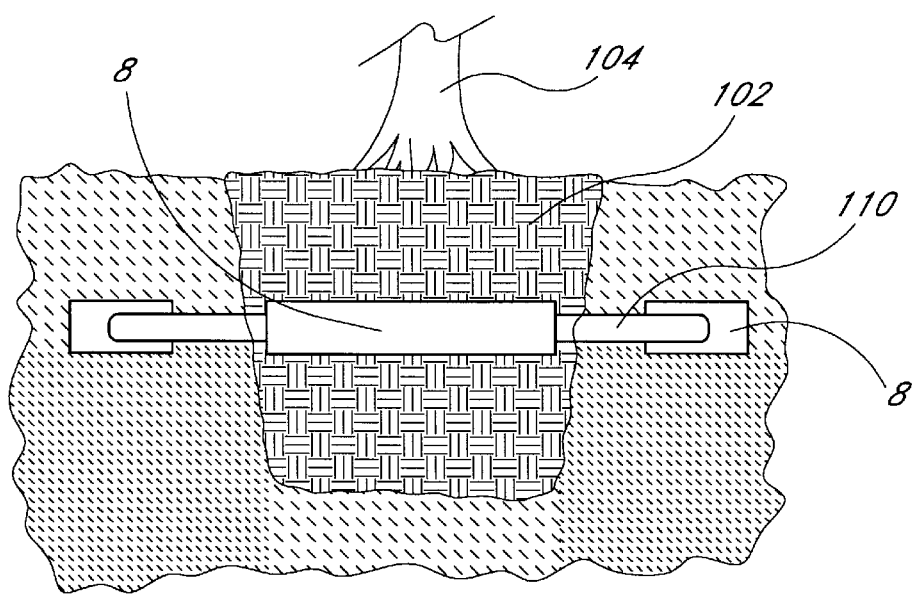
FIG. 7 is a side view of the subirrigation system for trees shown in FIG. 6.

Referring to FIG. 7, there is shown a side view of the subirrigation system for trees illustrated in FIG. 6. The reservoirs 8 and linking tubing 110 are placed around the root ball 102 of the tree 104 at a depth in the range of about 24 to about 4 inches below the surface. More preferably, the depth is about 18 to about 8 inches, and most preferably about 12 to about 8 inches below the surface. It has been found that placement of the reservoirs around the root ball of the plant, sufficiently below the surface, stimulates root growth downward and outward, and away from possible hardscapes surrounding the base of the trunk. With traditional surface irrigation, sidewalks, decorative grates, curbs and/or buildings are frequently damaged by roots that have risen to the surface toward the water.

In another embodiment of the subirrigation system for trees, the reservoirs and accompanying installation layers may be designed to serve the dual purposes of both irrigating and serving as physical root barriers. For example, with reference to FIG. 8, there is illustrated a top view of a subirrigation system for trees. Two reservoirs 8, each having one or more troughs (not shown) are illustrated. The reservoirs operate in accordance with the same basic trough design and capillary action principles as previously discussed with respect to FIGS. 1–2. Moreover, the reservoirs in this embodiment are placed at approximately the same lateral distance from the root ball and depth as detailed above for FIGS. 6 & 7. In this embodiment, however, the reservoirs are shaped to at least partially encircle the tree 104 and root ball 102. The reservoirs are provided with at least one fill tube 60 and linking tubing 110 between the reservoirs for a single planting, as described above with respect to FIGS. 6 & 7. A further linking tube 112 is provided for the optional connection of rows of trees, for example, lining a street.

Figure 8:
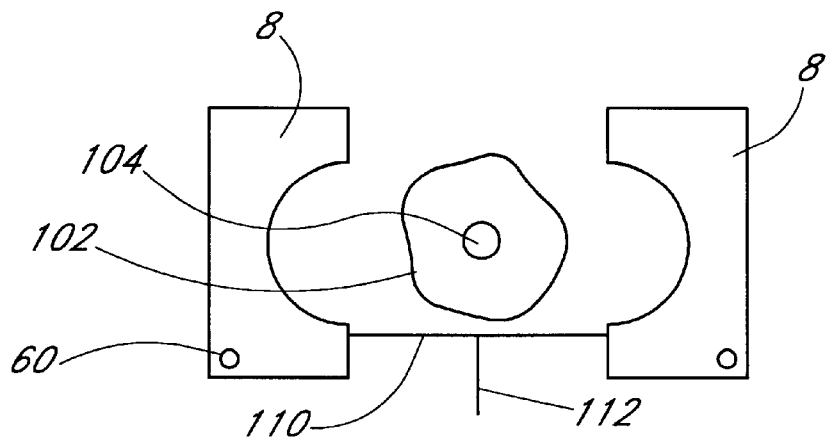
FIG. 8 is a top view of another embodiment of a subirrigation system for trees wherein the reservoirs form a root barrier.

In a variation of the subirrigation system for trees shown in FIG. 8, the further linking tube 112 may be connected to a water source which can be manually or automatically actuated when the level of water in the reservoirs becomes low. As will be clear to those of skill in the art, the addition of a pressure sensitive valve to linking tube 112 can be used to control the flow of water into the reservoir. Preferably, the valve is a pressure-sensitive ¾" DIG valve using a range of about 5 to 15 PSI. An automated system may include in addition to the pressure-sensitive valve, a pressure regulator on the source of irrigating liquid. Preferably, the irrigating liquid is pressurized to a pressure within the range of 8 to 10 PSI. The valve may be a physical pressure-sensitive valve, an electrically actuated, or solenoid valve, and/or a pneumatic valve. In manual systems, an operator-actuated valve may be used.

Figure 11:
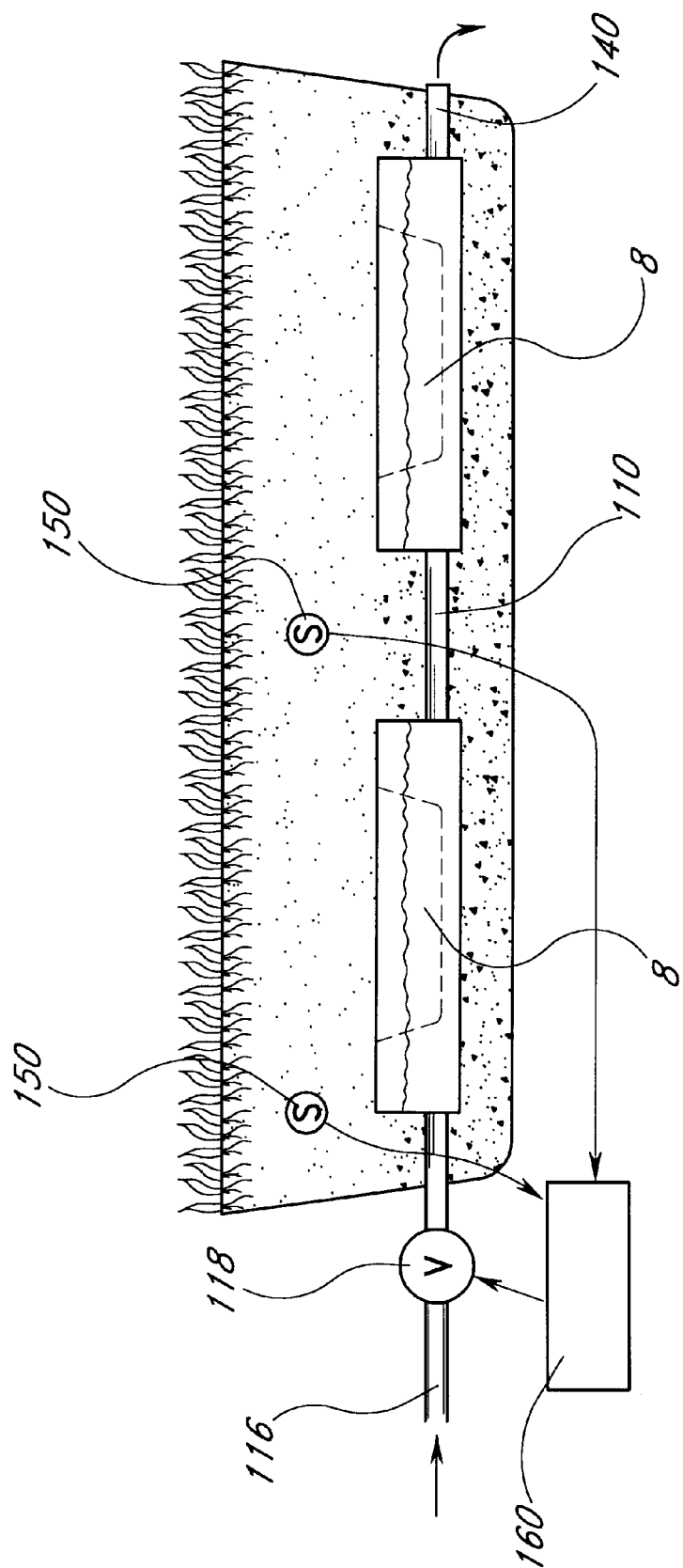
FIG. 11 is a schematic view of an automated subirrigation system in accordance with the present invention.

Optional additions to the automated system include a fertilizer and/or pesticide injector, a heater and/or cooler for changing the temperature of the irrigating liquid and/or the air, a circulation pump to circulate the water and prevent the water from becoming stagnant, a water filter to remove undesired contaminants and particulates, an evacuation system for pumping out stale irrigant, an overflow drain, a flow meter to monitor the flow of water into the system, moisture sensors, a clock or timer-based controller, and a microprocessor-based control unit, for providing user-programmable integration of monitoring and control operations (see FIG. 11).

Figure 9:
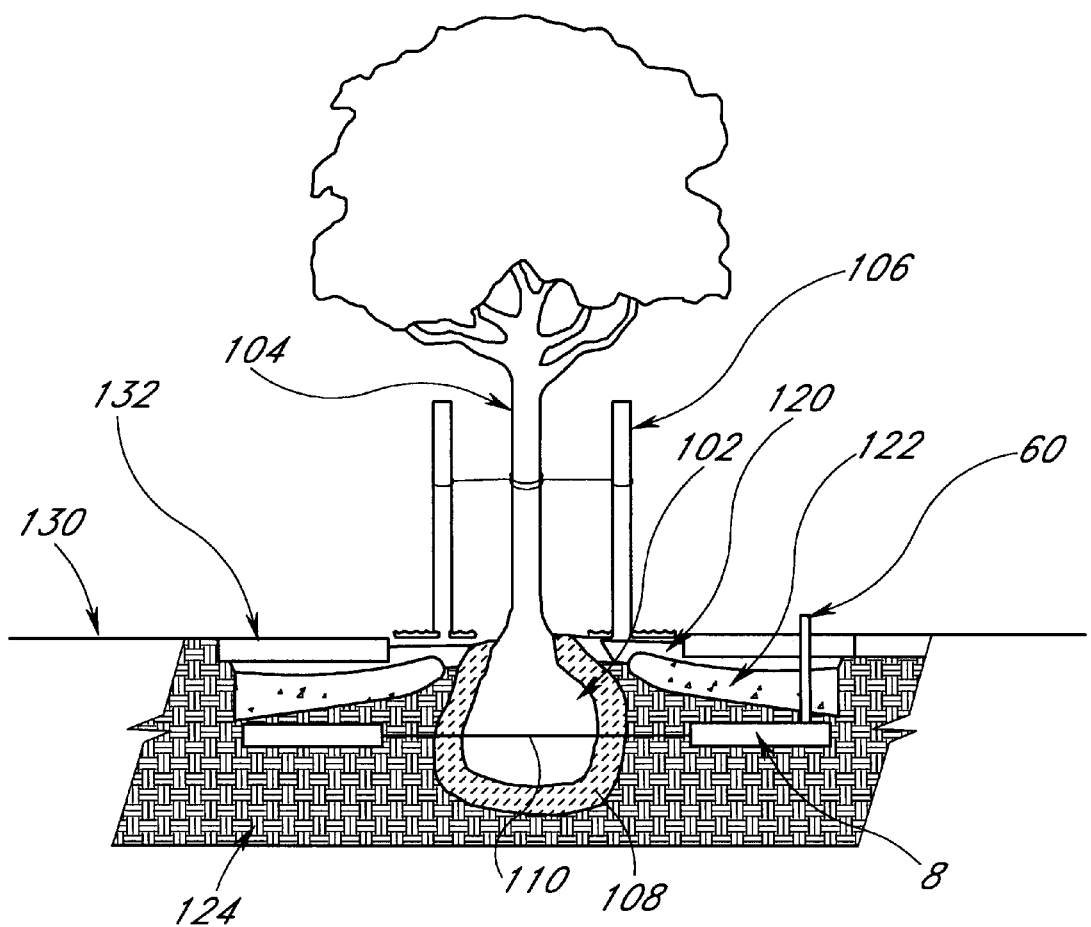
FIG. 9 is a side view of the root barrier subirrigation system for trees shown in FIG. 8.

Referring to FIG. 9, there is shown a side view of the linked subirrigation system for trees described. above with reference to FIG. 8. The root ball 102 and tree 104 are planted in the soil and stabilized by conventional stakes and ties 106. The root ball is preferably surrounded by a layer of porous soil mixture 108 formulated as detailed above to facilitate movement of water by capillary action from the reservoirs 8, through the native soil 124, and into the root system. A layer of non-absorbent porous material 120, such as decomposed granite, may be placed over the root ball, to inhibit weed growth, provide a decorative appearance, and facilitate water percolation. The reservoirs 8 are shown surrounding the root ball 102. As detailed above, the reservoirs 8 include at least one fill tube 60 to provide air exchange and permit manual filling with water with or without supplement (e.g., fertilizer, pesticide, antifungal and antialgal formulations, etc.). The reservoirs 8 are also linked by at least one linking tubing 110. In a preferred embodiment, a circular layer of porous gravel 122, such as pea gravel, which is too porous to retain water, is included between the reservoirs 8 and the surface 130 of the hardscape 132 above, e.g., sidewalk, new tree well, etc. The gravel layer 122 will break upward capillary water movement, while allowing the surface water to drain down into the roots. Consequently, the upward migration of roots is inhibited.

The embodiment of the subirrigation system for trees illustrated in FIGS. 8 & 9 is particularly advantageous for trees lining public by-ways such as streets, open plaza's, malls, and sidewalks, because in addition to the many advantages of subirrigation discussed above, this design also inhibits the upward growth of roots. Surface roots damage hardscapes such as sidewalks, curbs, streets, grates, walls and buildings. Thus, providing water through capillary movement below the hardscapes, in combination with the physical barrier to root growth provided by the arcuate-shaped reservoirs themselves, and/or additional layers that inhibit root growth (e.g., pea gravel) minimizes root damage to surface structures and hardscapes.

In summary, it has been found that installation of the subirrigation system for trees illustrated in FIGS. 6–9: (1) saves up to 80% in water costs, (2) causes tree roots to stay deep, thereby avoiding hardscape damage, (3) reduces initial tree losses during the first year by as much as 50%, provides optimum root growth and tree development, (4) reduces losses from tree diseases, (5) eliminates irrigation system vandalism and theft, (6) reduces the cost of irrigation system installation by as much as 20%, and (7) eliminates the need for root barriers and tree well covers as the tree wells can be filled to the surface of the planting area, thereby limiting liability from trip hazards.

Another specific application for the subirrigation system of the present invention is in planter boxes. Planter boxes may be constructed adjacent to or as part of buildings. These may vary in size and shape from small window boxes, to large, block-long, planters attached to the sides of large commercial structures. The subirrigation systems of the present invention are particularly well suited for use in such planter boxes. During building construction and/or renovations, the reservoirs and linking tubing can be readily installed, along with desired automating accessory components like valves, drains, moisture or rain sensors, and system controllers, to provide virtually maintenance-free irrigation. In some cases, depending on the climate, rain sensors may communicate directly with electric valves to close the valves and bypass normal pressure-dependent refilling. The use of rain sensors also allows the reservoirs to act as traps for the rainwater; drains may be installed to provide for the safe and controlled removal of excess water. The construction of planter boxes having the linked subirrigation reservoirs avoid the many problems associated with surface watering, particularly for commercial buildings and walkways.

The reservoirs in accordance with the present invention can be made of any materials that are resistant to water and sufficiently strong to bear the weight of the soil. Preferably, the materials are sturdy enough to withstand extremes of pressure and temperature, including freezing temperatures wherein the water inside the reservoir may freeze and expand. Preferably, the reservoirs and tubing are also constructed of materials sufficiently resistant to potential damage from burrowing animals. More preferably, the reservoirs may be made of fiberglass, polypropylene, polyethelene, or other polymeric material. Most preferably, the reservoirs are made of polyethelene. The tubing used for linking reservoirs, providing air and water, and for providing drainage is preferably made of a similar tough polymeric material. Most preferably, PVC tubing used.

Figure 10:
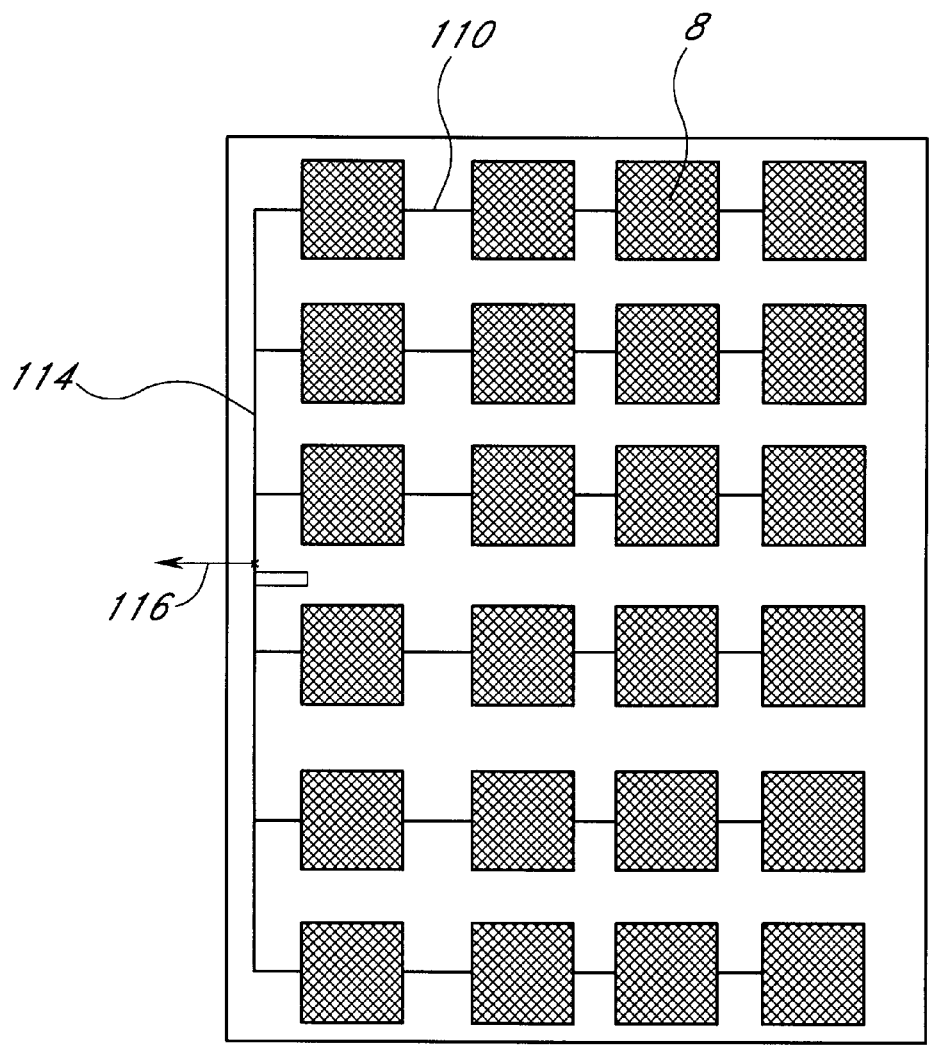
FIG. 10 is a plan view of a reservoir layout for a large turf area.

A plan view of a reservoir layout for a large turf area, such as a golf green, tennis court, or sports field is illustrated in FIG. 10. The same general layout can also be customized for smaller turf areas, such as street mediums, small areas between planters and walks, turfgrass close to buildings, and areas within atriums, solariums, private patios, etc. As can be seen, reservoirs 8 interconnected by linking tubing 110 to form rows of reservoirs. In the illustrated embodiment, the rows of reservoirs are in fluid communication with a perimeter line 114, which runs along one side of the large area and connects to the linking tubing 110 from each row. More than one perimeter line may be employed. The perimeter line 114 is connected to a supply line 116 that is hooked up to a pressurized water source. Preferably, the supply line 116 has at least one valve for automatically regulating the addition of water to the perimeter line and the reservoirs. Any number of variations may be used in the plumbing scheme as long as each reservoir is provided with a water source. Preferably, the reservoirs are also provided with at least one drainage line, for draining excess water that may result from rain or other sources of surface moisture.

To insure that each of the reservoirs receives a sufficient supply of water and air, the reservoirs are installed substantially level with one another. Where sloped areas need to be irrigated, individual rows are installed so as to traverse the slope; the individual rows are supplied by separate supply lines 116. Furthermore, the reservoirs are spaced so that the distance between reservoirs is from about one half to about 2 times the length of a single reservoir. More preferably, the reservoirs are spaced about one reservoir length apart from each other. As discussed more fully above, a layer of absorbent soil formula is used above the reservoirs to foster capillary movement of water and diffusion of oxygen up to the roots.

A schematic view of an automated subirrigation system in accordance with the present invention is shown in FIG. 11. Reservoirs 8 are connected by linking tubing 110, preferably ¾ inch PVC tubing. A pressurized supply line 116 having a valve 118 is connected via an inlet to one reservoir. A drainage line 140 is connected via an outlet to the second reservoir. Moisture sensors 150 are shown distributed in the soil above the reservoirs 8 and under the roots of the plants. The moisture sensors 150 communicate with a controller 160 comprising a logic circuit, relay, computer, microprocessor, or the like, which is capable of monitoring the signals generated by the moisture sensors 150 and actuating the valve 118. When the moisture content of the soil reaches a preset low level, the valve 118 in pressurized supply line 116 is opened to permit refilling of the reservoirs. The drainage line 140 may or may not employ a similar controller actuated valve (not shown). Alternatively, pressure-sensitive mechanical valves, such as those described above, may be used on the inlet and optionally on the outlet, thereby obviating the need for a controller.

While a number of preferred embodiments of the invention and variations thereof have been described in detail, other modifications and methods of use will be readily apparent to those of skill in the art. Accordingly, it should be understood that various applications, modifications and substitutions may be made of equivalents without departing from the spirit of the invention or the scope of the claims.

What is claimed is:

1. A linked subirrigation system, comprising:
at least first and second reservoirs, each reservoir having a top, a bottom, and sidewalls, each reservoir being capable of holding an irrigating liquid, wherein the top has a plurality of holes therethrough, the top also having therein at least one open trough with a trough floor which is disposed between the top and the bottom of the reservoir, wherein said trough floor has a plurality of holes therethrough;
an inlet port affixed to a first opening in one of said side walls of each reservoir and an outlet port affixed to a second opening in another said side walls of each reservoir, the inlet and outlet ports being positioned above said trough floor, wherein the irrigating liquid may be supplied to the reservoir through the inlet port and drain from the reservoir through the outlet port;
at least one linking tube connecting the outlet port of said first reservoir to the inlet port of said second reservoir, such that the irrigating liquid supplied to said first reservoir may flow out from the outlet port of said first reservoir through the linking tube and into the second reservoir through the inlet tube in said second reservoir, wherein any additional reservoirs are linked in the same manner using additional linking tubes; and a supply line with a first end connected to the inlet port of said first reservoir and a second end connected to a pressurizable source of irrigating liquid.

2. The linked subirrigation system of claim 1, further comprising an absorptive soil, adapted to support an upward capillary movement of the irrigating liquid from said trough floor in each reservoir to a plant's root system located above the reservoirs.

3. The linked subirrigation system of claim 2, wherein the absorptive soil comprises a mixture of sand or perlite, peat moss, ground bark, and composted mulch, said soil having a total porosity from about 50% to about 90% by volume when dry and a pH range from about 5 to about 7.5.

4. The linked subirrigation system of claim 3, wherein the sand or perlite comprises from about 5% to about 20% by volume of the absorptive soil.

5. The linked subirrigation system of claim 3, wherein the peat moss comprises from about 10% to about 30% by volume of the absorptive soil.

6. The linked subirrigation system of claim 3, wherein the ground bark comprises from about 20% to about 60% by volume of the absorptive soil.

7. The linked subirrigation system of claim 3, wherein the composted mulch comprises from about 15% to about 50% by volume of the absorptive soil.

8. The linked subirrigation system of claim 3, wherein the absorptive soil comprises a mixture of about 10% by volume sand or perlite, about 20% by volume peat moss, about 40% by volume ground bark and about 30% by volume of composted mulch.

9. The linked subirrigation system of claim 2, wherein the absorptive soil comprises a mixture of about 10% by volume sand or perlite, about 20% by volume peat moss, about 40% by volume ground bark and about 30% by volume of composted mulch.

10. The linked subirrigation system of claim 2, wherein the inlet port of said first reservoir further comprises a pressure-sensitive valve for regulating delivery of the irrigating liquid into the linked subirrigation system.

11. The linked subirrigation system of claim 1, where the outlet port of one reservoir is connected to a drain tube.

12. A subirrigation system for deployment beneath one or more plants, comprising:

a reservoir having a bottom, side walls, and a top, and also having at least one trough with a trough floor which is disposed between the top and bottom of the reservoir, wherein said trough floor has a plurality of holes therethrough, an inlet port affixed to a first opening in one of said side walls of the reservoir and an outlet port affixed to a second opening in another said side walls of the reservoir, wherein an irrigating liquid may be added to the reservoir through the inlet port and drain from the reservoir through the outlet port;

a supply line connected to the inlet port of the reservoir, the supply line being adapted to deliver irrigating liquid to the reservoir from a pressurizable source of irrigating liquid;

a valve disposed between the supply line and the inlet port, wherein the valve is adapted to regulate the delivery of irrigating liquid to the reservoir; and an absorptive soil, comprising a mixture of sand or perlite, peat moss, ground bark and composted mulch, wherein the absorptive soil is adapted to transfer irrigating liquid from the reservoir to a plant's roots.

13. The subirrigation system of claim 12, further comprising a plurality of reservoirs which are arranged in a series having at least first and last reservoirs, wherein the outlet port of each reservoir in the series, except the last reservoir, is connected by a linking tube to the inlet port of the next reservoir, and the outlet port of the last reservoir is connected to a drain tube.

14. The subirrigation system of claim 12, wherein the supply line is a flexible tubing with two ends, one adapted to connect to the inlet port of the reservoir and the other adapted to connect to a conventional faucet, wherein the irrigating liquid is water.

15. The subirrigation system of claim 12, further comprising a controller in communication with at least one moisture sensor positioned in the soil and the valve, wherein the controller opens the valve to allow delivery of irrigating liquid from the pressurizable source to the reservoir when the moisture sensor detects a preset low moisture content in the soil.

16. The subirrigation system of claim 12, further comprising at least one of a fertilizer/pesticide injector, a heater/cooler, a circulating pump, a filter, an evacuation pump, an overflow drain, a flow monitor, and a timer.

17. The subirrigation system of claim 12, further comprising two reservoirs each having an arcuate shape adapted to partially surround a root ball of a large plant or tree.

18. The subirrigation system of claim 17, further comprising a layer of gravel overlying at least a portion of the root ball, wherein the combination of the shaped reservoirs and the layer of gravel cooperate to inhibit an upward growth of roots.

19. The subirrigation system of claim 12, wherein the absorptive soil has a total porosity from about 50% to about 90% by volume when dry and a pH range from about 5 to about 7.5.

20. The subirrigation system of claim 19, wherein the sand or perlite comprises from about 5% to about 20% by volume of the absorptive soil.

21. The subirrigation system of claim 19, wherein the peat moss comprises from about 10% to about 30% by volume of the absorptive soil.

22. The subirrigation system of claim 19, wherein the ground bark comprises from about 20% to about 60% by volume of the absorptive soil.

23. The subirrigation system of claim 19, wherein the composted mulch comprises from about 15% to about 50% by volume of the absorptive soil.

24. The subirrigation system of claim 19, wherein the absorptive soil comprises a mixture of about 10% by volume sand or perlite, about 20% by volume peat moss, about 40% by volume ground bark and about 30% by volume of composted mulch.

25. The subirrigation system of claim 12, wherein the absorptive soil comprises a mixture of about 10% by volume sand or perlite, about 20% by volume peat moss, about 40% by volume ground bark and about 30% by volume of composted mulch.

26. The subirrigation system of claim 12, further comprising at least one of a fertilizer/pesticide injector, a heater/cooler, and a flow monitor.

* * * * *